Figure 1:
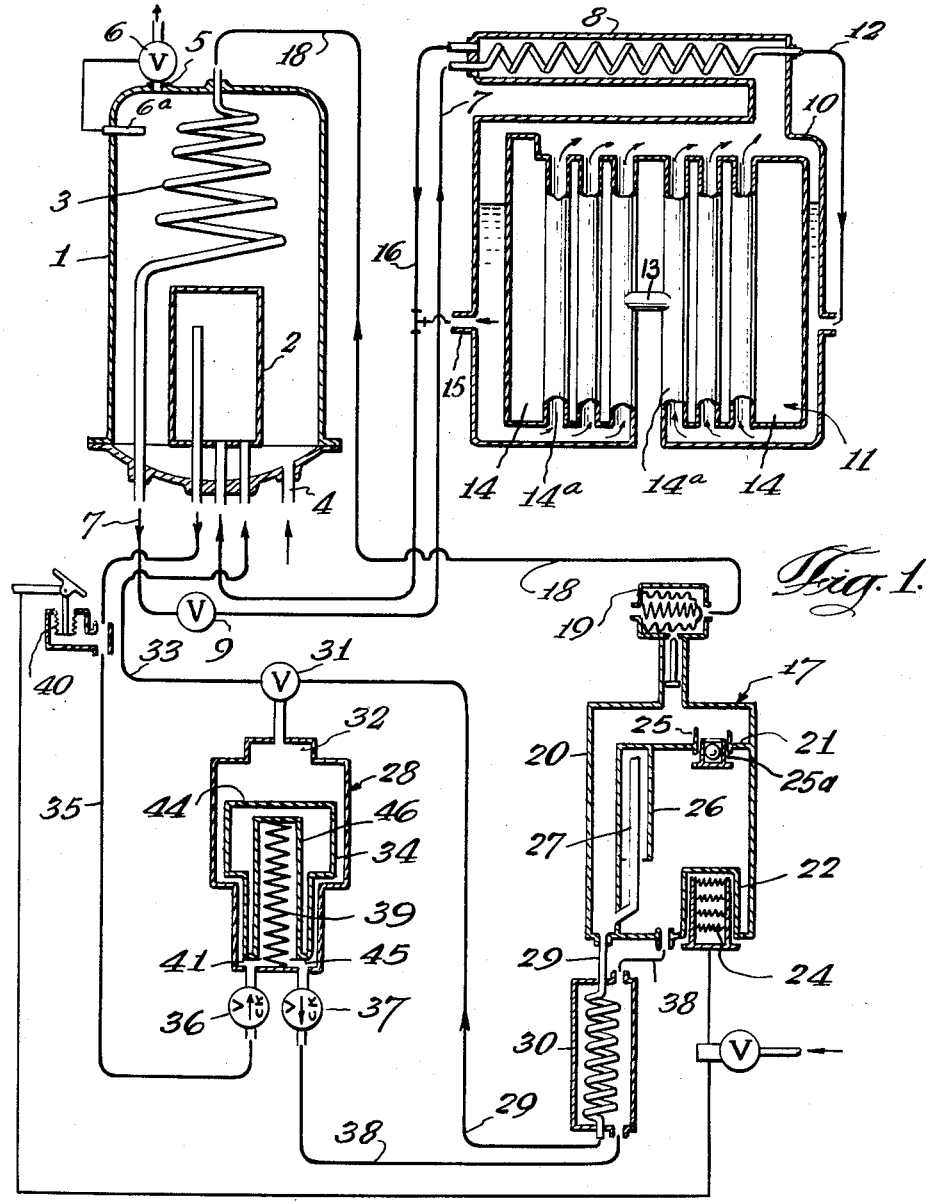

March 29, 1960 H. LANG 2,930,204
REFRIGERATOR
Filed Feb. 21, 1956

INVENTOR.
Heinrich Lang
By Shroeder, Hofgren, Brady & Wegner
attorneys

United States Patent Office 2,930,204
Patented Mar. 29, 1960

2,930,204

REFRIGERATOR

Heinrich Lang, Frankfurt am Main, Germany

Application February 21, 1956, Serial No. 567,033

4 Claims. (Cl. 62—148)

My invention relates to refrigerators of the absorber type, wherein a gaseous or liquid cooling agent and a solvent are circulated in closed circuits.

This application is a continuation-in-part of my copending application, Serial No. 283,003, filed April 18, 1952, and now abandoned.

There are two types of conventional refrigerators: the continuously operating type and the periodically operating type. There are two groups of the former: in the first group circulating means driven by an external source of energy are interposed between the absorber and the generator; in the second group, the circulation of the solution is effected by a thermo-siphon effect. The latter group has a relatively low thermal efficiency and dissipates only small quantities of heat. Therefore, this second group is suitable for small apparatus and is used for domestic purposes, where only a limited refrigerating effect is required. The first group is suitable for relatively large installations, especially for the utilization of industrial waste heat.

For the first group of conventional, continuously operating refrigerators, two different sources of external energy are needed, viz. external heat and external mechanical energy. These sources of external energy are always available in large industrial plants. The provision of the necessary mechanical means for such refrigerators presents no difficulty. These refrigerators are not expensive in comparison to refrigerators operated by a mechanical compressor. Therefore, the installation of refrigerators of the first group for the utilization of industrial waste heat is generally justified.

The main object of my invention is to provide a simplified continuously operating refrigerator of the absorption type whose cost of operation is reduced by the use of heat only as the source of external energy.

According to my invention, the refrigerant itself is used as driving means for a device affecting and accelerating the circulation of the refrigerant solution utilizing the difference of potential energy existing between the generator and the absorber. With my invention, a continuous and steady performance of the thermo-dynamic process is obtained without the provision of external mechanical energy in addition to the supply of heat. To effect and accelerate the circulation of the solution a suitable device is interposed in the circuit of the solution, the driving impulse for this device being produced within the circuit of the solution exclusively by means of heat. This device may be a piston, diaphragm or rotary pump, an injector or any other kind of fluid conveying means known to those skilled in the art.

One feature of my invention is that a suitable pressure regulating means, such as a pressure operated valve or the like, is inserted in the circuit of the solution between the generator and the condenser to maintain a desired pressure in the generator.

Another feature is that the absorber and the condenser may be united to form a single device so that the same temperature can be maintained within these parts of the refrigerator in a very simple way.

A further feature is that the generator comprises a first chamber and a second chamber, means for heating the second chamber, an inlet to the second chamber for strong solution, an outlet between the second chamber and the first chamber for refrigerant vapor and means, as a siphon, for transferring weak solution from the second chamber to the first chamber.

Figure 2:
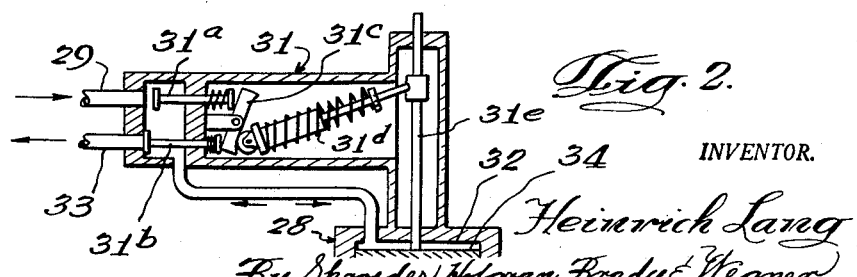

Further features and advantages will readily be apparent from the following specification and from the drawings, in which:

Figure 1 is a schematic diagram illustrating a refrigerating system embodying the invention; and Figure 2 is a fragmentary view, partially in section of a portion of the motor control mechanism.

A water filled tank 1, in which the heat produced during the refrigeration process and released from the solution is recuperated, contains an absorber 2 and a condenser 3 for the refrigerant. The condenser 3 is formed by a cone-shaped pipe spiral. Thereby, the laminar stream of the water in the tank 1 passing the lower parts of the condenser pipe is not effected by the upper parts of the pipe. Therefore, each pipe part has its own laminar stream, whereby a good heat exchange is obtained at a greater temperature difference.

Numeral 4 designates the inlet to and numeral 5 the outlet of the water from the tank 1, wherein the water is heated by heat exchange with the hot solution flowing through the condenser 3. A valve 6 actuated automatically by a thermostat $6a$ and inserted in the water outlet 5 regulates the discharge of the water, whereby the temperature and thus the pressure of the refrigerant solution in absorber 2 and condenser 3 are maintained within predetermined limits.

A pipe 7 connects the condenser 3 with a heat exchanger 8. Within this pipe a suitable throttling means such as an orifice plate 9 is provided permitting flow of the liquid parts of the fluid from the condenser to the heat exchanger 8 but barring flow of vapors carried along with the fluid. The plate 9 is removably inserted into the pipe 7 and may be interchanged with another plate whose bore has a different diameter. Thereby, the quantity of the flowing fluid can be regulated.

The fluid passing the heat exchanger 8 and flowing therefrom through a pipe 12 into an evaporator 11 transfers its latent heat within the exchanger 8 to the refrigerant vapors produced in the evaporator 11 and supplied to the heat exchanger 8 by a connecting pipe 10. The refrigerant vapors which are superheated in the heat exchanger 8 are fed to the absorber 2 by a connecting pipe 16. The evaporator 11 is preferably subdivided into two compartments 14 formed by vertical evaporating tubes and connected by a pipe 13. The liquified refrigerant precooled in the heat exchanger 8 and supplied therefrom to the evaporator 11 is evaporated in the vertical tubes $14a$ of the compartments 14. The particles of the absorption agent carried along with the refrigerant through heat exchanger 8 into the evaporator 11 are not evaporated in this device. With increasing distance from the evaporator inlet the absorption agent particles are more and more concentrated and accumulate in the lower portion of the compartments 14. The concentrated absorption agent is fed into the pipe 16 through an overflow 15 where it mixes with the refrigerant vapors from heat exchanger 8 and the mixture is returned to the absorber 2. Thereby regeneration of the contents of the evaporator 11 is assisted.

A generator 17 is connected with the upper end of the cone-shaped condenser pipe coil 3 by a pipe 18 in which a pressure operated overflow or outlet valve 19, serving as a regulating means, is inserted. The generator 17 has a first or outer compartment 20 and a second or inner compartment 21. In the inner compartment a closed chamber 22 is provided which is adapted to be heated by a burner 24 for solid, liquid or gaseous fuel or by a conventional electric heater. An outlet 25 for refrigerant vapor is provided in the top wall of compartment 21, communicating with compartment 20, and is provided with float valve 25a adapted to be actuated by the liquid level within the inner compartment. On the inner sidewall of the compartment 21 a tube 26 is provided which is closed at its upper end open at its lower end and connected with the outer compartment 20 by a pipe 27. Tube 26 and pipe 27 constitute a siphon, the operation of which is initiated by the valve 25 as will be explained.

The overflow valve 19 serving as regulation means has an adjustable spring and a diaphragm. The force of this spring which actuates the valve 19 is adjusted in such a manner that a predetermined pressure must be reached within the compartment 20 before valve 19 is opened so that the vapor in the outer compartment 20 of the generator 17 can pass this valve and flow through pipe 18, condenser 3 and evaporator 11 into the absorber 2 in a gaseous or liquid state. Thereby, the pressure maintained within the generator 17 is independent of the pressure within the condenser 3. A predetermined pressure difference between the generator 17 and the absorber 2 is needed for operating the fluid conveying device 28 which will now be described.

The fluid conveying device 28 illustrated in the drawing is a vertical piston pump. The cylinder of this pump has an upper part 32 of a greater diameter than the lower part 41. A gas and liquid-tight differential piston 34 is slidably arranged within the cylinder and has an upper surface 44 larger than the lower surface 45. A spring 39 placed in a central bore 46 of the lower end of the piston is adapted to move the piston into its upper position. The part 32 of the pump cylinder is connected with a snap valve 31 and the part 41 is provided with inlet and outlet check valves 36 and 37, respectively.

Conduit means, including sections 29 and 33, are connected between an outlet at the bottom of the first chamber 20 of the generator, through a heat exchanger 30 and snap valve 31, to an inlet of the absorber 2. Conduit means, including sections 35 and 38, are connected between the outlet of the absorber 2, through the pump portion 41 of device 28 and heat exchanger 30, to the inlet of generator chamber 21. A pressure operated regulator 40 associated with the conduit 35 at the outlet of absorber 2 controls the supply of energy to the generator heating means 24 and thus controls the evaporating temperature of evaporator 11 in accordance with the pressure in absorber 2.

Referring now to Figure 2 it will be seen that the snap valve 31 includes a pair of valve members 31a and 31b which are operated alternately by a mechanism including a rocker arm 31c and a spring plunger 31d connected with an operating arm 31e. The operating arm 31e is connected to the piston 34 of device 28 so that when the piston is in its uppermost position, as shown in Figure 2, valve 31a, associated with conduit 29 from generator chamber 20, is open and pressure within the generator is communicated to the upper chamber 32 to drive piston 34 downwardly, ejecting rich solution in the lower chamber 41 through outlet check valve 37 and loading spring 39. At the lower end of piston travel, the positions of valves 31a and 31b are reversed, 31a closing and 31b opening. The force of spring 39 then moves the piston 34 upwardly ejecting the operating medium in the upper cylinder through conduit 33 to the absorber and at the same time drawing rich solution from the absorber into the lower chamber 41 through inlet check valve 36. At the end of the upward movement of the piston, the position of snap valve 31 reverses and the cycle is repeated. Outlet valve 19 maintains a sufficient pressure in the generator to insure operation of the fluid conveying device 28.

The operation of the generator 17 and fluid conveying device 28 will now be considered. Assume that the generator chamber 21 is partially filled with refrigerant solution. As refrigerant vapor is driven off by heating element 24, the vapor passes from chamber 21 to chamber 20 through outlet 25, the float valve 25a being open. When the pressure of the vapor in the generator reaches a desired point, valve 19 opens and part of the vapor passes through conduit 18 to condenser 3. Meanwhile, another portion of the refrigerant vapor passes through conduit 29 to snap valve 31. Assuming that the piston 34 is in its upper position this vapor, under the pressure maintained in the generator, enters the upper portion 32 of the cylinder and drives the piston downwardly, causing operation of the pump as previously described to force rich solution from the absorber into the inner generator chamber 21. Due to the pressure maintained in the generator the refrigerant vapor is superheated and thus is not condensed in the heat exchanger 30 which serves to preheat the rich solution before it enters the generator. The volume of refrigerant evaporated from the solution in the generator is less than the volume of solution added to the generator by operation of the pump and therefor generator chamber 21 is gradually filled. Since the inlet for rich solution is at the bottom, the liquid in the upper portion of chamber 21 will be primarily a poor solution. When the level of liquid in chamber 21 reaches float valve 25a the valve begins to close and the velocity of the flow of refrigerant vapor through outlet 25 increases until valve 25a seats abruptly. The abrupt closing of valve 25a and the continued build-up of refrigerant vapor pressure in chamber 21 causes the solution in the chamber to overflow the top of pipe 27 initiating the operation of the siphon made up of tube 26 and pipe 27. This siphon continues to operate, transferring the poor solution from chamber 21 to chamber 20, until the level of solution in chamber 21 falls below the bottom of tube 26. The poor solution, which is now collected in the lower portion of chamber 20, is forced through conduit 29 by the generator pressure and now serves as the operating medium for the differential piston pump. When all of the poor solution has been transferred to the absorber 2, refrigerant vapor is once again used as the operating medium for the piston pump and the cycle is repeated.

As previously described, the outlet valve 19 for the generator maintains the desired pressure condition within the chamber 20. At the same time the thermostatically operated valve 6 controls the flow of cooling water through tank 1 regulating the temperature and thus the pressure, within the absorber 2 and condenser 3, maintaining these pressures at a level such that the refrigerant vapor may pass from the generator to the condenser and refrigerant vapor or weak solution, as the case may be, may pass from the generator to the absorber. In the event the absorber pressure should fall below a desired level, pressure regulator 40 increases the supply of fuel to the heater 24 increasing the rate at which refrigerant vapor is provided by the generator.

Any refrigerator of the absorber type depends with respect to its thermal efficiency upon the ambient temperature. However, in a refrigerator according to this invention it is possible to maintain relatively high pressures within the condenser and the generator, these pressures being independent of each other. Consequently, the difference between the temperatures of the media passing the heat exchangers is relatively high and the heat exchange is efficient. Therefore, a refrigerator according to this invention is especially adapted for the use at hot places, such as large kitchens, tropical regions, mines, etc. The heat consumed by the burner 24 is largely recuperated within the vessel 1 by heat exchange between the water flowing through this vessel and the gaseous or liquified fluid flowing through the condenser 3. The preheated water discharged from vessel 1 through pipe 5 may be utilized for any desired purpose, its temperature being regulated by the action of valve 6. When the heated water is valuable, the refrigeration effect developed in the evaporator 11 is produced at negligible costs. In this case, the costs for the fuel or the electric current supplied to the burner 24 are offset by the receipts from the sale of heated water.

While I have shown and described certain embodiments of my invention, it is to be understood that it is capable of many modifications. Changes therefore, in the construction and arrangement may be made without departing from the spirit and scope of the invention as disclosed in the appended claims.

I claim:

1. In a continuously operating absorption refrigeration system, including an absorber, a generator for generating refrigerant vapor from rich solution, leaving weak solution, and a condenser, operating means of the character described, comprising: first conduit means, for refrigerant vapor, connected between an outlet of said generator and said condenser; second conduit means, for weak solution and refrigerant vapor, connected between an outlet of said generator and an inlet of said absorber; third conduit means, for rich solution, connected between an outlet of said absorber and an inlet of said generator; pump means in said third conduit means for pumping rich solution from said absorber to said generator; means connected in said second conduit means and operated alternately by weak solution and refrigerant vapor for driving said pump; and means for maintaining at least a predetermined pressure in said generator, independent of the pressures in the remainder of the system.

2. An absorption refrigeration system of the character described in claim 1, wherein said generator has a first chamber and a second chamber, the inlet to the generator is in the second chamber, the first and second conduit means are connected to the first chamber, and including means for heating the second chamber and means for transferring weak solution from the second chamber to the first chamber.

3. An absorption refrigerator system of the character described in claim 2, wherein said means for transferring weak solution from the first chamber to the second chamber comprises siphon means.

4. In a continuously operating absorption refrigerator system, including an absorber, a generator and a condenser, operating means of the character described, comprising: pump means for transferring rich solution from the absorber to the generator; first conduit means connected between the generator and absorber for returning weak solution from the generator to the absorber; motor means for driving said pump means, connected in said first conduit means to be operated by the pressure in said generator; second conduit means connected between said generator and said condenser; pressure regulator means in said second conduit means for maintaining at least a predetermined pressure in the generator, independent of the pressure in the remainder of the system; a tank having said absorber and condenser mounted therein; means for causing flow of water through said tank to cool said absorber and condenser; means for regulating said flow of water to maintain the absorber and condenser at a predetermined temperature; and means for regulating the heating of the generator as an inverse function of the absorber pressure.

References Cited in the file of this patent

UNITED STATES PATENTS

| | | |
|---|---|---|
| 983,731 | Lindemann | Feb. 7, 1911 |
| 1,105,171 | Zander | July 28, 1914 |
| 1,109,021 | Southworth et al. | Sept. 1, 1914 |
| 1,134,269 | Hiester | Apr. 6, 1915 |
| 1,161,678 | Howe | Nov. 23, 1915 |
| 1,841,136 | Lenning | Jan. 12, 1932 |
| 1,856,765 | Hull | May 3, 1932 |
| 1,860,133 | Brock | May 24, 1932 |
| 1,866,825 | Smith | July 12, 1932 |
| 1,890,531 | Schurtz | Dec. 13, 1932 |
| 2,237,302 | Flukes | Apr. 8, 1941 |
| 2,722,806 | Leonard | Nov. 8, 1955 |
| 2,850,266 | Merrick et al. | Sept. 2, 1958 |